Patented Mar. 30, 1937

2,075,358

UNITED STATES PATENT OFFICE 2,075,358

PROCESS FOR COOLING LIQUIDS

Gilbert Nelson Reeves, London, England

No Drawing. Application September 6, 1933, Serial No. 688,355. In Great Britain February 10, 1933

8 Claims. (Cl. 99—60)

The present invention relates to an improved process for cooling liquids containing, in suspension or otherwise, relatively large amounts of substances (e. g. fat) which undergo a physical change of state in the process of cooling, with liberation of heat during the change from liquid state to solid state. The process is especially applicable to the treatment of real cream and synthetic cream.

The invention is particularly applicable to processes for the preservation of milk products, particularly cream-like emulsions having a relatively high fat content, during the cooling of which the fat content solidifies at a temperature intermediate the initial and final temperatures of said cooling step.

While both milk and cream vary a good deal in fat content, whole milk, in many localities is required by law to contain a minimum of 3% to 3.5% of fat, and cream is required to contain a minimum of 15% to 20% of fat. In practice, most whole milk and cream contain at least these amounts of fat. The present invention is particularly concerned with the treatment of such products as contain much more fat, in emulsified state, than does average grade milk, and preferably several times more than 4% thereof.

For the preservation of such enriched milk products the mixture is brought rapidly from a temperature, such as pasteurization temperature, substantially above the point of solidification of the fat to a temperature substantially below that point and below ordinary atmospheric temperature, at which lower temperature the product is maintained for a desired or predetermined time.

When large quantities of such products are to be so cooled the most convenient method is by passing them continuously through channels in a cooling machine. I would have it understood that when in this specification and its claims I speak of a cooling process, I mean a process in which the cooling is wholly or mainly carried out by passing the liquid in a stream or streams through channels or over surfaces of the cooling apparatus, and not processes in which a large bulk of the emulsion is placed in a cold room. In practice however I have found grave difficulties in carrying out this process, as when the mixture emerges from the cooling machine at the desired temperature, a rise in temperature tends to take place, which seriously interferes with the process and with the keeping qualities of the product. This rise may be considerable, and in practice I have found that an emulsion which has been cooled to 34° F. will rise in some cases as high as 55° F. Generally speaking, the higher the fat content of the cream or other emulsion, the greater will be this rise in temperature.

This rise in temperature may be attributed to the retarded drop in the temperature of the fat globules compared to the drop in temperature of the liquid content of the mixture, due to the effects of latent heat which is converted into sensible heat, during the change of the fat from the liquid to the solid state and the slow transmission of such heat from the fat to the liquid.

I have found that the process by which the fat gives up its latent heat and dissipates this heat through the mixture is a comparatively slow one, and that it would be difficult if not impracticable to deal with such products in large quantities by prolonging the time of passage through the cooling machine, as this would necessitate machines of such great size and cost, the use of excessive power and pressures for forcing the liquid through, and also an objectionable additional agitation of the product. Nor could the desired result be achieved in practice by immediately passing the product for a second time through the cooling apparatus, as in general it would emerge the second time from the cooling apparatus before the process of heat surrender and heat exchange (between the fat and the aqueous portion of the emulsion) has been completed, and a rise in temperature will again take place.

To the foregoing ends the present invention consists in an improved process for cooling such liquids as are hereinabove referred to by first cooling the liquid to a temperature below the point at which the physical change of state of the substance in the liquid will occur, then interrupting the cooling process for a sufficient time to permit the liquid to assume its new physical state and preferably to reach throughout a substantially uniform temperature below the temperature at which the change of state occurs, and, after the change of state has taken place, further cooling the mixture to the temperature desired.

The process will be now described more specifically in connection with the preservation of a synthetic cream product manufactured by intimately mixing milk or skimmed milk and a hardened vegetable fat distributed throughout the liquid in a very fine state of homogenization, such as that produced according to U. S. Patent No. 1,941,261. In the treatment of such a product produced for example, by appropriate heat treatment, e. g., at a temperature of between 134°–194° F., of the mixture of 40% fat and 60% milk and an emulsifying agent e. g., egg yolk, the mixture is passed through a heat exchanger and thereby rapidly cooled from a temperature above the solidification point of the fat, say 85° F., to a temperature considerably below this, and near to the final low temperature, say to a temperature of 38° F., then allowed to stand for say 20 minutes. During this time of standing a heat interchange takes place between the fat or dispersed phase and the surrounding milk or continuous phase of the fat and milk globules and the temperature in the case of a product in the above proportions will rise to a substantially uniform temperature of say 55° F. Thereafter the product is again led to the heat exchanger and cooled to say 34° F. and then led to a container and maintained in a suitable cold storage room or like for a desired length of time at say 34° F.

The times necessary for the desired change to take place and the heat to be distributed, vary with the nature and proportion of the constituents, and their state of division and mixture.

The interruption of the cooling process should occur at such point that the temperature thereafter does not rise above the hardening point of the fat although I prefer to prolong such interruption till the mixture has attained uniform temperature yet if the subsequent cooling endures long enough to ensure that at its termination uniform temperature throughout is attained, or if a comparatively small rise of temperature at the end of the process is not considered objectionable the subsequent cooling may be commenced before such equilibrium is attained throughout. If, however, the interruption takes place at a temperature considerably below the hardening point of the fat the transmission of the latent heat takes place more quickly and equilibrium is sooner reached.

The process according to the present invention is also well suited for the treatment of natural or emulsified substances such as dairy cream. This material of course contains much more butter fat than does whole milk.

Where the cooling process involves the passage of a liquid through comparatively narrow tubes the process is generally only applicable in cases where the fat is finely distributed and does not bear too great a proportion to the rest of the liquid otherwise it may be found that with the fat in a hardened condition great difficulties are experienced in passing the liquid through the tubes of the cooling apparatus. The limits of applicability of the invention from this point of view depend both on the nature of the machine used and the physical and chemical constituents of the liquid.

Although the invention has been more specifically described in connection with liquids containing fusible substances in suspension, it is also applicable for the treatment of other liquids, in which physical changes take place as the temperature is reduced, which result in a slow or retarded emission of latent heat and transmission of such latent heat to the body of the liquid.

The process may be carried out continuously for example by causing the liquid to flow from the heat exchanger through a suitable holder, e. g., a coil, and into another exchanger or again into the first exchanger, and though this involves additional channel length the addition need not be great since it is not necessary that the bulk of the liquid should be in close vicinity to the surface of the coils, which may be of any desired diameter, nor is it necessary that these surfaces should be cooled.

What I claim is:—

1. Process for cooling a hot liquid cream product having a high fat content, by a cooling process wherein the said liquid product is caused to flow in stream form in contact with cooling surfaces, which process consists in first cooling the said liquid product from a temperature above that at which solidification of the melted fat particles can occur, to a temperature below the point at which the said solidification occurs, interrupting the passage of the cream product along the cooling surfaces at such a temperature and for such a time as to allow the mixture to assume its new physical state at a temperature below that at which solidification of the fat particles will occur, then further cooling the said product to near 34° F.

2. Process for cooling a hot emulsified liquid containing as the disperse phase, not less than about 20% of a substance which undergoes solidification during the process of cooling, which process comprises causing such liquid to flow in stream form in contact with cooling surfaces, until its temperature is considerably below the point at which said solidification of the dispersed substance in the liquid occurs and at substantially below normal room temperature, interrupting the passage of the mixture along the cooling surfaces for such a time as to allow the disperse phase constituent to assume its solid state, whereby the temperature of the liquid rises, then completing the cooling of the mixture to near freezing temperature.

3. Process for cooling, after heating a cream product having a high fat content, the fat of which will harden on cooling, wherein the liquid product flows in stream form in contact with cooling surface, which consists in so cooling the liquid to a temperature considerably below the point at which solidification of the fat in the liquid product will occur, interrupting the passage of the product along the cooling surface at such a temperature and for such a time as to allow the said substance in the mixture to completely solidify at a comparatively uniform temperature below melting point of said fat, then completing the cooling of the product to refrigeration temperature.

4. Process for cooling a hot liquid containing emulsified therein not below 20% of a substance which undergoes solidification during cooling, which process comprises continuously passing quantities of the liquid over cooling surfaces to cool the liquid rapidly to a temperature much below the point at which the solidification of the said emulsified substance occurs, collecting the liquid leaving the cooling surfaces, and after allowing it sufficient time to completely assume its solid state at an equilibriated temperature below the melting temperature of said solidified substance, passing it again over cooling surfaces to complete the cooling of the mixture to a refrigeration temperature.

5. A continuous process for cooling a hot liquid containing a substance which undergoes solidification during the process of cooling, which consists in continuously passing quantities of the liquid over cooling surfaces of a heat exchanger to cool the liquid rapidly to a temperature below the point at which incipient solidification of the said substance occurs while carried in said liquid, causing the liquid leaving the cooling surface of the heat exchanger to flow into a receptacle in which it remains until the said solidification of said substance is completed, and then flowing the liquid again in contact with cooling surfaces of a heat exchanger until cooled to a refrigeration temperature.

6. Process for cooling a hot liquid cream product having a high fat content, which process comprises rapidly cooling the said liquid product by flowing it in contact with cooling surfaces, to a temperature well below the point of solidification of the fat, interrupting the contact with cooling surfaces of a quantity of the mixture at such a temperature and for such a time as to allow the fat to completely assume its solid state while the said liquid product is at a temperature below the temperature of the solidification of the fat, then completing the cooling of the mixture by contact with cooling surfaces, to a refrigeration temperature.

7. Process for cooling a hot liquid cream product which is an emulsion having a high fat content, which process comprises cooling the liquid by flowing it in contact with cooling surfaces, to a temperature considerably below atmospheric temperature and considerably below the point of solidification of the fat, interrupting the contact of said liquid product with such cooling surfaces when said liquid product is at such a temperature, and for such a time as to allow the fat to assume its solid state while at a temperature below the temperature of the solidification of the fat, then continuing the cooling by flowing said liquid product in contact with cooling surfaces sufficiently to bring the mixture to a temperature near 34° F., and maintaining the mixture at that temperature.

8. Continuous process for cooling a hot liquid edible cream-like emulsion containing in the emulsified state, a high fat content and containing proteins in solution, which consists in rapidly cooling the liquid by flowing it in contact with cooling surfaces to a temperature well below the point of solidification of the fat, causing the liquid leaving the cooling surfaces to flow through a coil so that the cooling is interrupted for such a time as to allow the fat particles in the mixture to assume a completely solidified state and to reach a substantially uniform temperature throughout, then passing the liquid again into contact with cooling surfaces until the desired low temperature is reached.

GILBERT NELSON REEVES.